United States Patent
Murray et al.

(10) Patent No.: US 12,080,985 B1
(45) Date of Patent: Sep. 3, 2024

(54) COMPACT LASER CAVITY AND METHODS OF MANUFACTURE

(71) Applicant: Arete Associates, Northridge, CA (US)

(72) Inventors: James Murray, Longmont, CO (US); Micah Boyd, Longmont, CO (US)

(73) Assignee: Arete Associates, Northridge, CA (US)

( * ) Notice: Subject to any disclaimer, the term of this patent is extended or adjusted under 35 U.S.C. 154(b) by 0 days.

(21) Appl. No.: 17/157,953

(22) Filed: Jan. 25, 2021

Related U.S. Application Data

(60) Continuation of application No. 16/435,496, filed on Jun. 8, 2019, now Pat. No. 10,903,617, which is a division of application No. 15/225,805, filed on Aug. 1, 2016, now Pat. No. 10,714,887.

(60) Provisional application No. 62/199,919, filed on Jul. 31, 2015.

(51) Int. Cl.
| | |
|---|---|
| *H01S 3/08* | (2023.01) |
| *H01S 3/06* | (2006.01) |
| *H01S 3/081* | (2006.01) |
| *H01S 3/083* | (2006.01) |
| *H01S 3/105* | (2006.01) |
| *H01S 3/107* | (2006.01) |
| *H01S 3/0941* | (2006.01) |

(52) U.S. Cl.
CPC ............ *H01S 3/083* (2013.01); *H01S 3/0602* (2013.01); *H01S 3/08054* (2013.01); *H01S 3/08059* (2013.01); *H01S 3/08095* (2013.01); *H01S 3/0813* (2013.01); *H01S 3/0817* (2013.01); *H01S 3/105* (2013.01); *H01S 3/107* (2013.01); *H01S 3/0941* (2013.01)

(58) Field of Classification Search
CPC .... H01S 3/08054; H01S 3/0818; H01S 3/083; H01S 3/113; H01S 3/115; H01S 3/08095; H01S 3/08059
See application file for complete search history.

(56) References Cited

U.S. PATENT DOCUMENTS

| | | | | |
|---|---|---|---|---|
| 4,520,486 A | * | 5/1985 | Lavarini | H01S 3/034 |
| | | | | 372/99 |
| 6,430,206 B1 | * | 8/2002 | Debuisschert | G02F 1/39 |
| | | | | 372/95 |
| 6,813,285 B2 | * | 11/2004 | Peterson | H01S 3/0627 |
| | | | | 372/33 |
| 8,514,906 B1 | * | 8/2013 | Murray | H01S 3/0617 |
| | | | | 372/99 |

(Continued)

*Primary Examiner* — Michael Carter

(57) ABSTRACT

Provided herein are systems and methods of manufacture and operation for a compact laser to achieve high-intensity output pulses. These compact laser resonators and methods rely upon separate and distinct functions of the laser resonator to be operated in balance such that the functions, while deleterious when separate are supportive of laser generation and growth when combined within a small volume laser resonator as described herein. The combined elements of the described laser resonator include a delicate balance that allows the laser to operate between plane-parallel operation and unstable operation. This operation mode further allows distinct methods of construction and operation that allow the compact laser to be reliably assembled and tested during assembly. Therefore, despite requiring a delicate balance of disparate elements, the described laser resonator results in a compact robust laser.

11 Claims, 11 Drawing Sheets

(56) References Cited

U.S. PATENT DOCUMENTS

| | | | |
|---|---|---|---|
| 10,903,617 B1* | 1/2021 | Boyd | H01S 3/083 |
| 2006/0114962 A1* | 6/2006 | Ishizu | H01S 3/083 |
| | | | 372/106 |
| 2013/0230062 A1* | 9/2013 | McCarthy | H01S 3/08059 |
| | | | 372/10 |

* cited by examiner

US 12,080,985 B1

COMPACT LASER CAVITY AND METHODS OF MANUFACTURE

RELATED APPLICATIONS

This is patent application is a continuation application claiming priority under 35 USC 120 to co-pending U.S. patent application Ser. No. 16/435,496, entitled "COMPACT LASER CAVITY AND METHODS OF MANUFACTURE," and filed Jun. 8, 2019, which is a divisional application claiming priority under 35 USC 120 to U.S. patent application Ser. No. 15/225,805, entitled "COMPACT LASER CAVITY AND METHODS OF MANUFACTURE," and filed Aug. 1, 2016, which claims priority to U.S. Provisional Patent Application Ser. No. 62/199,919, entitled "COMPACT LASER CAVITY AND METHODS OF MANUFACTURE," and filed Jul. 31, 2015, and the disclosure of these applications is hereby incorporated by reference in its entirety for all purposes.

FIELD OF THE TECHNOLOGY

The present disclosure relates to compact laser resonator configurations and methods of producing the same.

SUMMARY OF THE DESCRIPTION

Provided herein are systems and methods of manufacture and operation for a compact laser to achieve high-intensity output pulses. These compact laser resonators and methods rely upon separate and distinct functions of the laser resonator to be operated in balance such that the functions, while deleterious when separate are supportive of laser generation and amplification when combined within a small volume laser resonator as described herein. The combined elements of the described laser resonator include a delicate balance that allows the laser to operate between plane-parallel operation and unstable operation. This operation mode further allows distinct methods of construction and operation that allow the compact laser to be reliably assembled and tested during assembly. Therefore, despite requiring a delicate balance of disparate elements, the described laser resonator results in a compact robust laser.

In some embodiments, as described further herein, the configuration of the bulk component resonator provides for significantly reduced size requirements and significantly increased thermo-mechanical hardiness while providing laser output meeting demanding output specifications, such as for pulsed output. Embodiments of the bulk component resonator construction and operation described herein include several reflectors in a single main plane and at least one out of plane reflector. A reverse wave suppression reflector (e.g., mirror, corner cube) provides unidirectional rotational modes and is positioned out of the resonant optical path. In some embodiments the reverse wave suppression reflector is also positioned out of the primary resonator plane. The resonator also includes a folded non-planar construction and built-in image rotation to stabilize the balance of the resonator and improve laser output for the embodiments. Magnification may be further added in several embodiments described herein to the round trip optical path. For example, magnification may be imparted or modified via a single bulk element, including using an assembly method placing or selecting the magnification-inducing/modifying bulk element during a final assembly/tuning phase. In some embodiments, the method may include selecting a magnification element to compensate for variations in the other elements of the resonator and/or their placement.

In one aspect, the disclosure describes an optical system including a non-planar laser ring resonator formed of a plurality of bulk components defining a resonant optical path with a first rotational direction and an opposing second rotational direction for light travelling on the resonant optical path. The resonant optical path exists on at least two different planes and is polarization output-coupled to preferentially output only a certainly polarized portion of the light in the resonant path that is travelling in the first rotational direction. The resonant optical path functions to induce a cavity net round-trip magnification greater than 0.9 in a round trip of the resonant optical path in either the preferred direction or the non-preferred direction.

Other embodiments and features of the present disclosure will be apparent from the accompanying drawings and from the detailed description which follows.

BRIEF DESCRIPTION OF THE DRAWINGS

The embodiments are illustrated by way of example and not limitation in the Figures of the accompanying drawings in which like references indicate similar elements.

DETAILED DESCRIPTION

Figure 1:
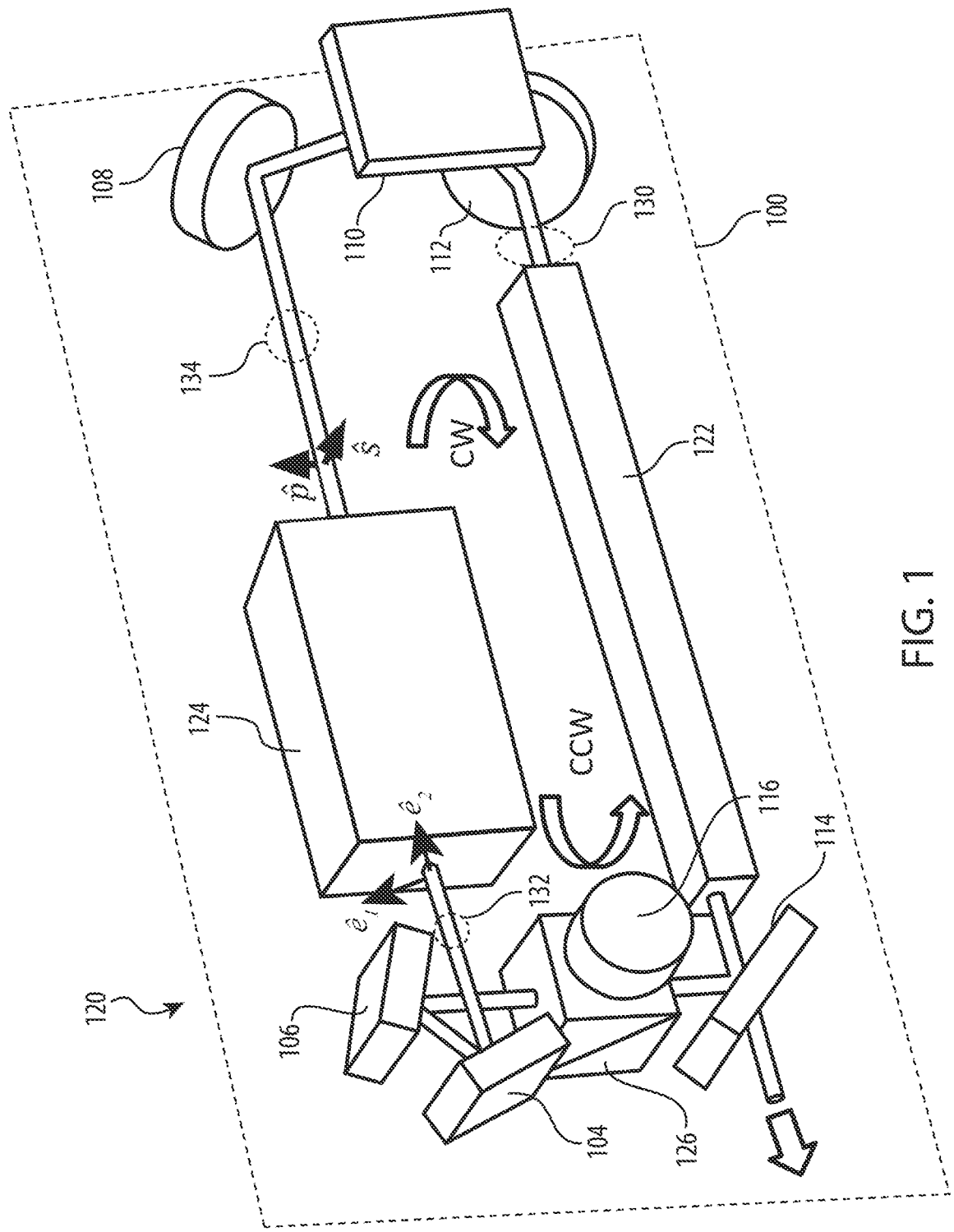
FIG. 1 shows an embodiment of a non-planar six reflector resonator with only a single out-of-plane reflector.

The following patent description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one. Reference in this specification to "one embodiment" or "an embodiment" or the like means that a particular feature, structure, or characteristic described in connection with the embodiment is included in at least one embodiment of the disclosure. The appearances of the phrase "in one embodiment" or the like in various places in the specification are not necessarily all referring to the same embodiment, nor are separate or alternative embodiments mutually exclusive of other embodiments. Moreover, various features are described that may be exhibited by some embodiments and not by others.

The resonators described herein have many operational functions combined into an extremely compact package. These functions include deleterious issues for laser design, such as causing instability or poor beam quality. However, using the particular resonator configurations described herein these functions and their deleterious issues are balanced carefully such that the effects are mitigated by their combination. The standard approach for using unstable ring resonators is to use geometric output coupling. Unstable resonators may be used for high power, but creating this high power in a compact package is fraught with issues. For example, unstable resonator conditions (e.g., beyond plane parallel magnifications greater than 1.0) will ineffectively produce laser light if combined with using only polarization output coupling and the other functions of the resonator described herein are not also includes. These other functions may include image rotation, optical powers of bulk components included in the resonator, net magnification per round trip and as accumulated over multiple round trips, non-planar ring resonator configurations providing coupled image and polarization rotation, and preferred rotational directions of rotational modes in the cavity via reverse wave suppression are all described herein. These aspects of the resonator include many deleterious effects that are mitigated, minimized, cancelled, and/or balanced by their careful and measured combination in this compact resonator to support robust operation.

The combined resonator has several conditions that are conventionally understood to cause a resonator to fail to operate. Absent some of the mitigations described herein, the resonators would not operate as described. The embodiments described herein allow operation in an unstable resonator condition (e.g., net magnification near or greater than 1.0, such as greater than 0.9) operating with polarization output-coupling. Resonators may operate with intentionally induced magnification conditions over 1.0 if they are geometrically output-coupled. However, these geometric output-couplings will only work for some modes (e.g., continuous modes) but will not work with the particular configurations and modes described herein.

Instead, as described herein "critically unstable" magnification conditions are created herein, where, by the particular configurations of effects of the resonator, the critically unstable magnification condition produces robust and optimized laser output.

Furthermore, producing a resonator that performs this complicated balance of elements is further simplified by a described method that tunes round trip magnification into this critically unstable operation condition. The method may be operated near or at the final assembly/tuning stage for the resonator. The described method allows for simple adjustment of the balance of magnification conditions and other resonator conditions to create an optimized output. In one embodiment, the method includes adjusting the optical power of a bulk component in a single direction, such as by inserting a cylindrical mirror with a large radius of curvature.

FIG. 1 shows an embodiment of a non-planar 6 reflector resonator with only a single out-of-plane reflector. In one embodiment, a bulk component reflector of the cavity also serves to induce magnification causing an unstable configuration into the cavity. This embodiment of the cavity provides adjustment of the radius of curvature of a bulk component of the cavity and thereby adjusting the round trip magnification imparted on the laser light. Furthermore, in this embodiment, by selecting a radius of curvature that tunes operation in a final or near-final stage of resonator assembly, a method is provided for achieving increased efficiency in assembling and tuning the resonator.

This embodiment utilizes the unique properties of a critically unstable condition of the resonator as described further herein to create an enhanced laser output. The critically unstable condition of the resonator may be tuned, as described herein particularly in the method of assembly, to create a refined laser output. This laser output is due to the novel particular configurations of the resonators described herein that combine the several deleterious elements of the resonator, including this critically unstable condition, along with image rotation and any potential misalignments of bulk components creating the optical path, and yet the resonator still produces a laser with high beam quality in a compact package. The assembly methods described herein, and further novel substitutions of a portion(s) of the resonator with a prism, provide additional benefits to the operating resonator while also address particular assembly realities for the laser.

In the embodiment shown, one of the bulk components of the laser, particularly one of the resonator's reflectors (e.g., reflector 104 or 106 in FIG. 1) on the optical path may be chosen to afford direct assembly of this bulk component for tuning of the round-trip magnification of the resonator to a critically unstable operational condition at or near the end of the assembly of the resonator, as described further herein with respect to the assembly method. By selecting a curvature of an element or inducing a differential heat flux on the gain medium to control the round-trip magnification of the resonator, the assembly technique saves a crucial magnification tuning step for the end of assembly and allows operational parameters to be measured, while this critically unstable condition is set up for the polarization output-coupled output laser light. Because balancing the critically unstable condition of the resonator to produce enhanced output beam quality requires tuning the output, adjusting the magnification of the round trip by adjusting one bulk component (e.g., replacing the bulk component or adjusting a quality of a bulk component) such as reflector, affords the assembly method with the particularly advantageous tuning step for the embodiments of the resonators described herein.

The illustrated embodiment of a non-planar 6 reflector resonator with only a single out-of-plane reflector provides the benefit of maintaining most of the assembled optical cavity within a single plane, which may garner the benefits of simpler alignment and lower manufacturing costs. The configuration of the shown embodiment also provides a particularly compact laser cavity, which may lead to a compact overall package size or allow external elements (e.g., an output periscope) to be included near the resonator in a compact optical system that includes the resonator.

The construction of the resonator 120, while being compact, also produces manufacturing and efficiency gains due to assembly efficiencies, tolerance of aberrations, and high output parameters given the compact size of the laser. For example, in the embodiment shown, the portions of the optical path connecting the out-of-plane reflector(s) to the Primary Resonator Plane 100 as shown, do not contain additional optical elements.

The embodiment shown of the six (6) reflector non-planar ring resonator 120 cavity is formed by Cavity Mirror 1 (104), Cavity Mirror 2 (106), Cavity Mirror 3 (108), Cavity Mirror 4 (110), Cavity Mirror 5 (112), and the Polarizing Output Coupler (114), which partially acts as the sixth reflector of radiation reflected further along the optical path of the resonator. In the embodiment shown, all of the cavity elements intercept the Primary Resonator Plane 100, except for Cavity Mirror 4 110.

In this embodiment, the Reverse Wave Suppression Reflector 116 (e.g., mirror), though it is not in plane with the Primary Resonator Plane 100, is also outside of the resonant optical path 118. In other embodiments, the Reverse Wave Suppression Reflector 116 may be configured to be in plane.

The Reverse Wave Suppression Reflector 116 may be a mirror, corner cube or other functional reflector. In other embodiments, feedback means may include a seed source of radiation for determining a preferred direction of rotation for the cavity 120. Other embodiments may include a spectral filtering component such as a volume Bragg grating.

The resonator 120 provides a preferential rotational mode for laser radiation rotating within the cavity. This preferential rotational mode of laser radiation is performed by feeding back a portion of early-developed light in the cavity so that a dominant rotational mode is selected for the lasing radiation. Therefore, rotational modes are designated herein as CW (clockwise) for light travelling from location 130 to location 132 and then to location 134 and CCW (counter clockwise) for light travelling from location 130 to location 134 and then to location 132. The separate rotational modes are simply designated by CW and CCW in various equations herein to designate the particular mode being evaluated.

The cavity includes a gain element to couple energy into the cavity. For example, the Gain Element 122 could be a crystal gain medium that is optically pumped, such as by a pump light diode. The Gain Element 122 can be located in different portions of the cavity in different configurations.

The cavity also includes a Polarizing Output Coupler 114 (e.g., a thin film polarizer). In one embodiment, the Polarizing Output Coupler 114 transmits out of the cavity light that is polarized parallel to the Primary Resonator Plane 100 and reflects light that is polarized perpendicular to the Primary Resonator Plane. With respect to polarization rotation, polarization may be controlled to, in turn, control laser output from the cavity at the Polarizing Output Coupler 114. In the present embodiment, the cavity includes one or more Pockels Cell(s) 124 for additional active polarization rotation. In other embodiments, other polarization rotators may be used.

As described further herein, rotation of light intensity patterns on successive round trips of the cavity, when properly performed, allows for averaging over thermal effects and aberrations, pumping aberrations or other aberrations in the beams of light that are formed within the cavity. Therefore, beams generated by these described cavities correctly incorporate light intensity pattern rotation to create beams with greater beam quality. For the embodiment illustrated with six reflectors in the non-planar configuration, on each round trip, the light intensity pattern is passively rotated by 90 degrees. As described further herein, the correct rotation of the light intensity pattern in this manner correctly averages the aberrations across the intensity patterns of the beams formed thereby.

The resonant cavities described herein may be configured to be operated in multiple ways. In one embodiment, due to the configuration of the Reverse Wave Suppression Reflector 116, the cavity 100 is configured to create either light traversing the cavity in a clockwise (CW) direction or light traversing the cavity in a counter clockwise direction (CCW), as shown by arrows in the FIG. 1. In another embodiment, the cavity may be configured to create light polarized either in the plane of the primary resonator plane ($\hat{p}$-pol) or perpendicular to the plane of primary resonator plane ($\hat{s}$-pol). In another embodiment, active polarization control or modification may be accomplished via an active polarization rotation element (e.g., Pockels cell 124). In yet another embodiment, the cavity may be configured to operate in conditions where the active polarization rotation elements are configured to provide approximately or near zero polarization rotation per round.

These operations of the resonator are described herein with the help of equations. For easier subscript reference in the equations listed herein, the resonator location 130 is further referred to herein as "location A," resonator location 132 is further referred to herein as "location B," and resonator location 134 is further referred to herein as "location C."

Neglecting gain and loss, the electric field polarization states for CW and CCW propagation between locations 130 (A), 132 (B), and 134 (C) on the diagram can be established using a matrix formalism. This matrix formalization of the electric field polarization states of light on the optical path illustrates the specific operation of the polarization output coupling used by many embodiments. As described further herein, this polarization output coupling both requires specific polarization states for output as well as reduces the ability to use plane parallel configurations. For example, unstable resonators may be used with geometric output coupling, given the particular output mechanisms therein, but there are several contraindications (e.g., alignment instabilities and/or perturbation sensitivities) to nearing plane parallel with another form of output coupling apart from geometric. Therefore, as described further herein, the balancing of contraindicated configurations in the resonator that supports high quality operation of the embodiments requires the analysis and techniques herein to create a stable resonator that otherwise is operating in unstable regimes.

For example, for a CW propagation, $$\vec{E}_{B,CW} = \begin{bmatrix} \mathcal{E}_s \\ \mathcal{E}_p \end{bmatrix}_{B,CW}$$

is the complex vectoral representation of the clockwise propagating light at location 132 (B), where $\mathcal{E}_s$ is the complex amplitude of the electrical field envelope in the $\hat{s}$-direction, and Ep is the complex amplitude of the electrical field envelope in the $\hat{p}$-direction.

The active polarization rotation component may be one or more Pockels cell, in which the light propagating with polarization along axis $\hat{e}_1$ is delayed by a phase $\delta$ relative the light propagating along the axis $\hat{e}_2$. The relative phase delay is controlled by an externally controlled voltage. The crystal axis of the Pockels cell is rotated with respect to the primary resonator plane by an angle $\theta_x$.

In the configuration shown, the electric field polarization state at location 132 (B) is transformed to the electric field polarization state at location 134 (C) for clockwise propagation as follows:

$$\vec{E}_{C,CW} = \underline{M}_{B \to C} \vec{E}_{B,CW}$$

$$\underline{M}_{B \to C} = \begin{bmatrix} \cos\left(\frac{\delta}{2}\right) - i\cos(2\theta_x)\sin\left(\frac{\delta}{2}\right) & -i\sin(2\theta_x)\sin\left(\frac{\delta}{2}\right) \\ -i\sin(2\theta_x)\sin\left(\frac{\delta}{2}\right) & \cos\left(\frac{\delta}{2}\right) + i\cos(2\theta_x)\sin\left(\frac{\delta}{2}\right) \end{bmatrix}$$

Light traveling clockwise from location 134 (C) to location 130 (A) results in a 90 degree rotation of the polarization and can be represented by $$\vec{E}_{A,CW} = \underline{M}_{C \to A} \vec{E}_{,CW}$$

With the rotation matrix $$\underline{M}_{C \to A} = \begin{bmatrix} 0 & -1 \\ 1 & 0 \end{bmatrix}$$

Clockwise propagating light that is polarized in the p̂-direction at location 130 (A) is transmitted through the polarizing output coupler, whereas light that is polarized in ŝ-direction at location 130 (A) is reflected to location 132 (B). Consequently, the following transfer matrix from A to B (130 to 132) is defined as follows:

$$\underline{M}_{A \to B} = \begin{bmatrix} 1 & 0 \\ 0 & 0 \end{bmatrix}$$

An output coupler transfer matrix from location 130 (A) to the output can be defined as $$\underline{M}_{A \to Out} = \begin{bmatrix} 0 & 0 \\ 0 & 1 \end{bmatrix}.$$

Therefore, for an embodiment as shown with an active polarization element (e.g., a Pockels Cell), the sequential application of these transfer matrices can be used to form a round trip polarization evolution matrix from location 132 (B) back to location 132 (B) as follows:

$$\underline{M}_{B \to B, RT, CW} =$$

$$\underline{M}_{A \to B} \underline{M}_{C \to A} \underline{M}_{B \to C} = \begin{bmatrix} i\sin(2\theta_x)\sin\left(\frac{\delta}{2}\right) & -\left[\cos\left(\frac{\delta}{2}\right) + i\cos(2\theta_x)\sin\left(\frac{\delta}{2}\right)\right] \\ 0 & 0 \end{bmatrix}$$

Additionally, a transfer matrix from location 132 (B) to the output can be written as $$\underline{M}_{B \to Out, CW} = \begin{bmatrix} 0 & 0 \\ \cos\left(\frac{\delta}{2}\right) - i\cos(2\theta_x)\sin\left(\frac{\delta}{2}\right) & -i\sin(2\theta_x)\sin\left(\frac{\delta}{2}\right) \end{bmatrix}$$

Similar transfer matrices exist for configurations and embodiments using propagation in the counter-clockwise (CCW) direction around the cavity. Counter-clockwise (CCW) directed light polarized in the ŝ-direction at location 132 (B) is transmitted through the polarizing cube 126 so that $$\underline{M}_{B \to A} = \begin{bmatrix} 1 & 0 \\ 0 & 0 \end{bmatrix}$$

Counter-clockwise light propagating from location 130 (A) to 132 (C) is rotated by the transfer matrix $$\underline{M}_{A \to C} = \begin{bmatrix} 0 & 1 \\ -1 & 0 \end{bmatrix}$$

Counter-clockwise propagating light traversing the Pockels cell undergoes polarization rotation described by the transfer matrix $$\underline{M}_{C \to B} = \begin{bmatrix} \cos\left(\frac{\delta}{2}\right) + i\cos(2\theta_x)\sin\left(\frac{\delta}{2}\right) & i\sin(2\theta_x)\sin\left(\frac{\delta}{2}\right) \\ i\sin(2\theta_x)\sin\left(\frac{\delta}{2}\right) & \cos\left(\frac{\delta}{2}\right) - i\cos(2\theta_x)\sin\left(\frac{\delta}{2}\right) \end{bmatrix}$$

The full round trip transfer matrix for counter-clockwise propagating light is given by $$\underline{M}_{B \to B, RT, CCW} = \underline{M}_{C \to B} \underline{M}_{A \to C} \underline{M}_{B \to A} = \begin{bmatrix} -i\sin(2\theta_x)\sin\left(\frac{\delta}{2}\right) & 0 \\ -\left[\cos\left(\frac{\delta}{2}\right) - i\cos(2\theta_x)\sin\left(\frac{\delta}{2}\right)\right] & 0 \end{bmatrix}$$

In the shown configuration, light traveling in the counter-clockwise (CCW) direction at location 132 (B) and that is polarized in the p̂-direction is reflected by the polarizing cube 126 to the Reverse Wave Suppression Reflector 116. In this embodiment, the light in the CCW direction is a non-preferred rotational mode, and using the Reverse Wave Suppression mirror as shown provides initial support for the preferred rotational mode of CW. This results in direct coupling to the clock-wise rotating p̂-polarized light at location 132 (B).

The transfer matrix for this process is simply $$\underline{M}_{B, CCW \to CW} = \begin{bmatrix} 0 & 0 \\ 0 & 1 \end{bmatrix}$$

With these transfer matrices defined, the electric field at location 132 (B) in the clockwise and counter-clockwise direction can be iterated through round trips using the following relations:

$$\vec{E}_{B, CCW, j+1} = g\underline{M}_{B \to BRT, CCW} \vec{E}_{B, CCW, j}$$

$$\vec{E}_{B, CW, j+1} = g\underline{M}_{B \to B, RT, CW} \vec{E}_{B, CW, j} + \underline{M}_{B \to B, CCW \to CW} \vec{E}_{B, CCW, j}$$

$$\vec{E}_{out, j} = g'\underline{M}_{B \to Out, CW} \vec{E}_{B, CCW, j}$$

where g is the net gain minus loss for the roundtrip, and g' is similar but for only the part of the cavity traversed from location 132 (B) through the output coupler.

The resulting resonance and output performance can be evaluated for conditions where δ=0 and where δ≠0. The results of these two conditions, and including the effects of the Reverse Wave Suppression Reflector 116, further described below with respect to FIGS. 2 and 3, creates particular radiation evolution pathways inside the cavity, allowing for effective high-power pulsed operation while using a single rotational mode within the cavity.

When δ=0, the matrix elements are greatly simplified, so that $$M_{B \to B, RT, CW} = \begin{bmatrix} 0 & -1 \\ 0 & 0 \end{bmatrix}; M_{B \to Out, CW} = \begin{bmatrix} 0 & 0 \\ 1 & 0 \end{bmatrix};$$

$$M_{B \to B, RT, CCW} = \begin{bmatrix} 0 & 0 \\ -1 & 0 \end{bmatrix}$$

Figure 2:
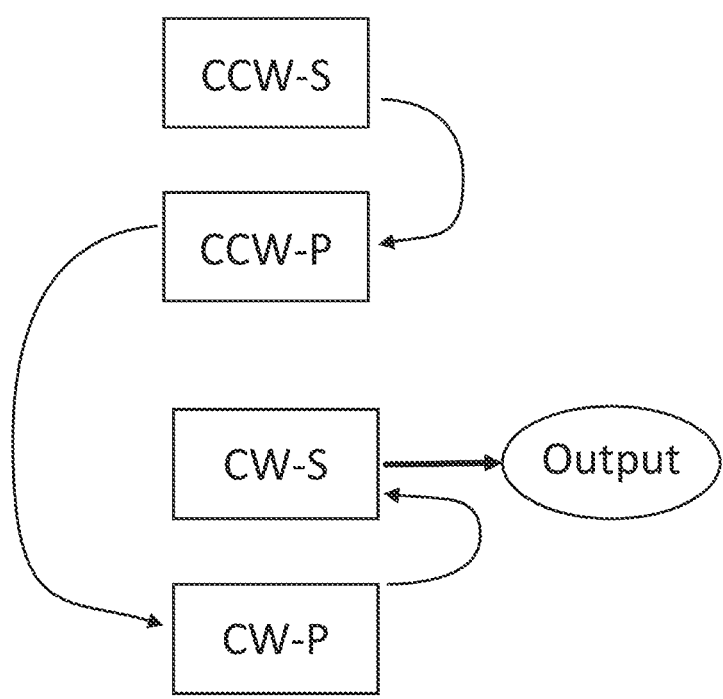
FIG. 2 shows coupling for s-pol and p-pol field components of clockwise and counter clockwise propagating radiation when $\delta=0$.

FIG. 2 illustrates a diagram with coupling for s-pol and p-pol field components of clockwise and counter clockwise propagating radiation when δ=0. In this condition, the resonator is spoiled and all spontaneous emissions from the gain medium are transmitted out of the output coupler within two round trips of the system. During this time while the resonator is spoiled, as further described herein, energy may be pumped into the gain medium in preparation of creating a pulse once the resonator cavity feedback is returned.

Figure 3:
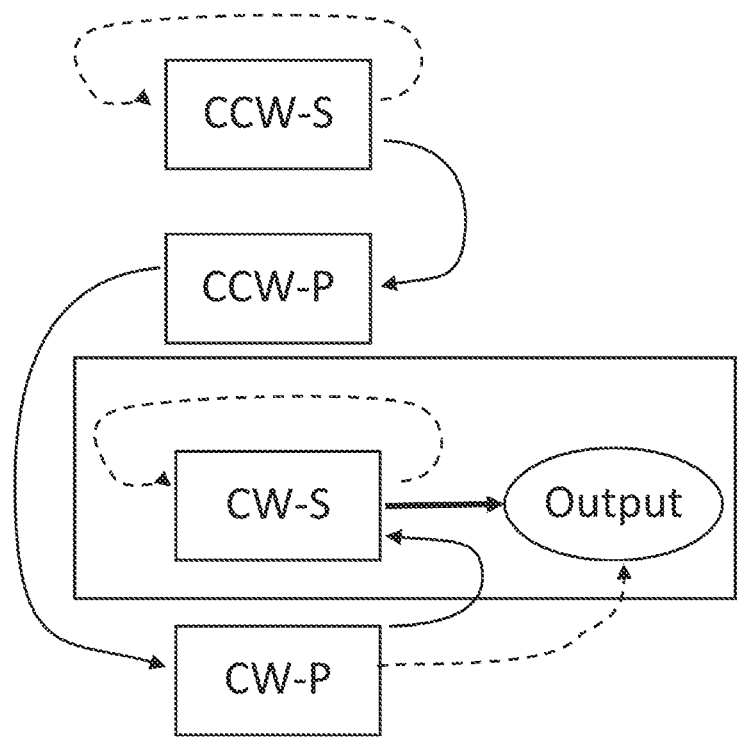
FIG. 3 illustrates a diagram for an embodiment of a single round-trip coupling between clockwise and counter-clockwise s-pol and p-pol light evaluated at location 110 (A) when $\delta \neq 0$.

FIG. 3 illustrates a diagram for an embodiment of round-trip coupling between clockwise and counter-clockwise s-pol and p-pol light evaluated at location 132 (B) when δ≠0. As δ is tuned to a non-zero value for the Pockels cell, the resonator described in FIG. 1 becomes more complex.

The dashed lines show the new resonant and output coupling pathways, though the originally described coupling associated with the solid lines remain and are also generally modified by δ.

In the embodiment shown, two resonances are formed shown in dashed lines for the s-polarized light propagating in either the CCW or CW direction. These are new resonances for the cavity as evaluated at location 132 (B) with δ≠0, or when the Pockels cell is operated to produce a rotation of 0°<θ<90.

Q-switching action is formed by tuning δ to zero to spoil the cavity during build-up of energy (e.g., via pumping) in the laser gain medium. Tuning δ to a value that provides a high-Q resonance for resonant cavity feedback causes the generation of giant pulses of energy out of the resonator. The CCW s-pol resonance is still coupled into the CW s-pol resonance via the CCW p-pol state and the CW p-pol state and the CW s-pol resonance is coupled to the output. Since the CCW resonance feeds the CW resonance before output, higher cavity powers are formed in the CW resonance. This allows the CW resonance to build up before significant energy can be coupled from the gain medium into the CCW resonance. Therefore, the build-up dynamics are dominated by the coupling indicated in the box.

Other embodiments may be adapted for operation that is different from the pulsed operation of the illustrated embodiments. For example, in one embodiment, a laser resonator may be constructed and may be operated by using a static polarization rotation (e.g., a waveplate) in place of, or in addition to, the active polarization rotation device, such as the Pockels cell. Such a configuration may be used to produce continuous wave emissions. In another embodiment, additionally or alternatively, a saturable absorber may be used within the resonant cavity to enable passive Q-switching operation.

For example, in the embodiment presented within FIG. 1, no intracavity waveplates are needed, reducing optical element counts. This improvement is due to the polarization rotation matching the image rotation of the round trip of the optical path, whereas a 4 mirror twisted rectangle cavity needs a waveplate to maintain polarization rotation per round trip. In practice, several embodiments may include intercavity waveplates can be added to the cavity to adjust the performance of the Pockels cell (e.g. requiring voltage to spoil cavity), and/or the requirements for operating the Pockels cell.

The polarization output coupler 114 in the embodiment shown in FIG. 1 is a thin film polarizer, but other polarizing components may be used. The output coupling is controlled by the polarization rotation selected at the dynamically-controlled polarization rotation device, illustrated in this embodiment as a Pockels Cell 124. Because the output coupling may be dynamically-controlled via the polarization rotation device, a high voltage signal applied to the dynamically-controlled polarization rotation device may be shaped to influence the pulse length and shape of the Q-switched laser pulse via the polarization rotation.

Image Rotation and Distortion Averaging

The particular embodiment of the cavity shown in FIG. 1 rotates the spatial intensity pattern by 90 degrees on every round trip. This embodiment is particularly advantageous because the spatial rotation of the intensity pattern need not be affected by any active polarization rotation mechanism.

Although 90 degree image rotation is provided for herein in the specific embodiment of a 6 mirror non-planar resonator, in other embodiments, the image rotation need not be 90 degrees per each round trip. For example, through positioning of Cavity Mirror 4 (110), or replacement of Cavity Mirror 4 (110) with a dove prism, the round trip rotation may be selected or tuned to another angle.

Using an even number of reflectors within the ring cavity, an intensity pattern rotation may be achieved without any additional inversion during round trip radiation propagation. Every reflection results in an inverted image which can be described as a transform matrix with determinant equal to −1. After an even number of these inversions, the product of the determinants from each reflection/inversion transform matrix will be equal to +1, which is equivalent to an image rotation, which may be equal to zero degrees or another angle of rotation.

The image rotation of the beam may be equal to zero degrees unless some other features are added to the reflectors. As described further herein, an out of plane reflector can affect the round trip rotation for these, and the rotation may be selected as 90 degrees or another angle. With at least one reflector (and associated optical path) placed out of plane of the resonator with respect to the other reflectors the rotations may be used to create image rotation and averaging between round trips as described further herein, including with respect to FIGS. 4 and 5.

Figure 4:
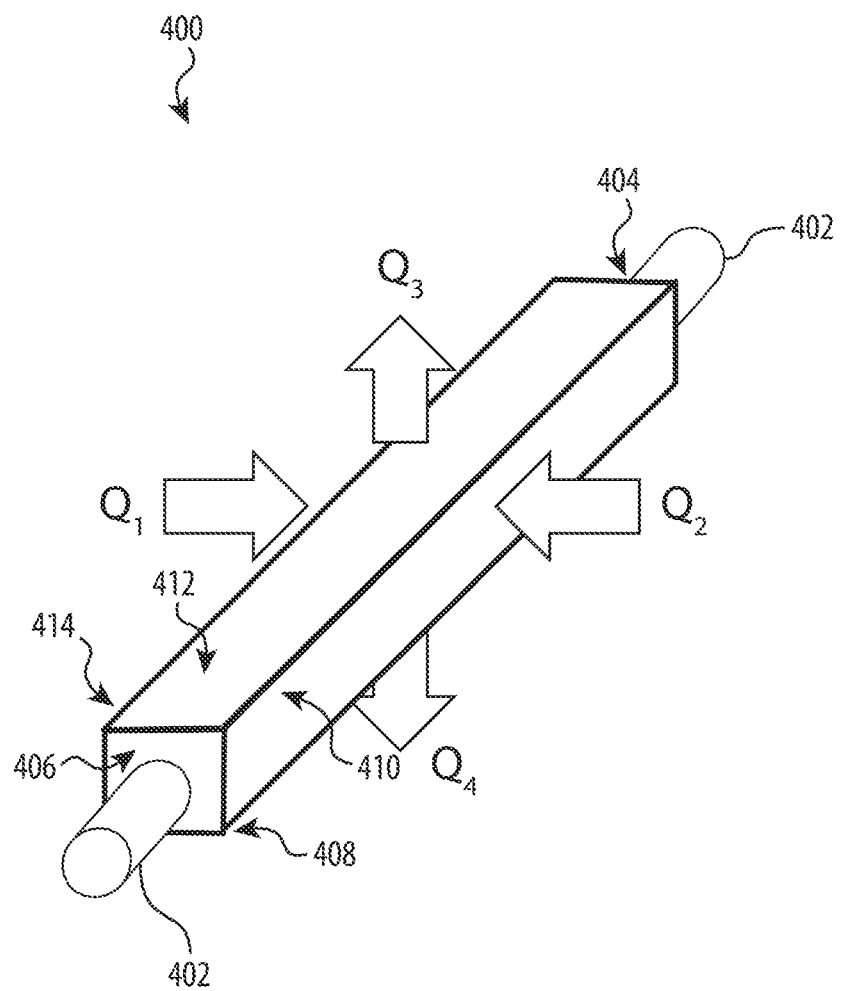
FIG. 4 illustrates an exemplary embodiment of a laser gain medium in the shape of a rectangular cylinder.

FIG. 4 illustrates an exemplary embodiment of a laser gain medium 400 in the shape of a rectangular cylinder. In this embodiment, the gain medium 400 has a physically symmetrical cross section in the shape of a square. The physically symmetrical configuration of this embodiment 400 is not limiting of the description, and is instead described herein as exemplary and to illustrate an integrated axially-symmetrical accumulated phase distortion after several round trips. Other embodiments may have different phase distortions per round trip, and may have other image rotations per round trip, thus creating different averaged phase rotations after different numbers of round trips.

In the illustrated generalized exemplary embodiment, the intra-cavity laser radiation 402 enters the gain medium 400 through a first face 404 of the rod and exits through a second face 406 of the gain medium 400. The remaining faces of the gain medium 400 each have thermal fluxes that heat or cool the gain medium 400. These thermal fluxes are also illustrated as exemplary orthogonal fluxes on the exemplary square cross-sections of the gain medium 400. In some embodiments, the gain medium has different cross-sections than square. In some embodiments, some or all of the gain medium 400 may be interfaced with (e.g., surrounded or covered by) another material, such as a pump light conduit that interfaces covering one or more faces of the gain medium.

In the exemplary embodiment, two opposite faces 414 and 410 of the gain medium 400 are heated, respectively, with the thermal fluxes Q1 and Q2. Alternatively, two other opposite faces 412 and 408 are cooled, respectively, with thermal fluxes Q3 and Q4 (having negative values, represented by arrows being directed outwards). The heating thermal fluxes Q1 and Q2 may be artifacts of input heat from the edge pumping of the crystal rod. For example, pump light may enter opposite faces 414 and 410, such as from a pump diode or a pump light cavity outside of the gain medium. In another embodiment, the heating thermal fluxes Q1 and Q2 may be a combination of direct heat conduction, such as from a physical connection with a pump diode, a pump cavity, and/or a heater/cooler. In another embodiment, convection or other heat may be included in the heating thermal fluxes Q1 and Q2, respectively, on faces 414 and 410 of the exemplary gain medium 400.

In the exemplary embodiment of the gain medium 400, the cooling thermal fluxes Q3 and Q4, respectively, may arise from active or passive cooling. For example, Q3 and Q4 may be a heat flow resulting from cooling an active cooling element (e.g., electric, solid state) or a passive cooling element such as a heat sink or solid body, or a combination of the same (e.g., liquid bath in contact with a heat sink).

In some embodiments, Q1 and Q2 may be approximately equal in magnitude. Alternatively or additionally, thermal fluxes Q3 and Q4 may be approximately equal in magnitude. In other embodiments, the fluxes are individually altered and/or alterable.

In some embodiments, Q3 and Q4 are controlled via an electronic control system, such as a controller determining the heat fluxes and controlling them via controlling the temperature or heat flux through of an element in contact with the respective surfaces 412 and 408 of the gain medium. In some embodiments, the heat fluxes Q1 and Q2 through the respective surfaces 414 and 410 are controlled, such as via an increase in pumping light which may be electronically controlled. This electronic control may be effected, for example, through changing a pump diode output and/or changing a coupling of the pump diode light into the gain medium.

For example, the integrated optical phase shift accumulated during light propagation through the rod, may have a functional form approximated by $\phi(x, y) = \alpha f(x) - \beta g(y)$, where $\alpha$ and $\beta$ are coefficients and $f(x)$ and $g(y)$ are phase distortion functions in two different directions.

In one embodiment, the radiation pattern rotates by 90 degrees after each rotation, without any inversions. In other embodiments, the radiation pattern rotates by different In embodiments where the radiation pattern rotates by 90 degrees after each rotation, without any inversions, the integrated optical phase shift accumulated after four round trips can be approximated by:

$$\phi_{4,\frac{\pi}{2}}(x, y) = \alpha(f(x) + f(-x)) - \beta(g(-x) + g(x)) + \alpha(f(y) + f(-y)) - \beta(g(-y) + g(y))$$

resulting in a distortion that is symmetric about the x-axis and y-axis and symmetric under 90-degree rotations.

In one embodiment, after four round trips, the integrated phase shift cancels out. For example, for the case where the horizontal phase-distortion balances the shape of the vertical phase-distortion (e.g., $\alpha f(\xi) \approx \beta g(\xi)$, or $\alpha f(\xi) \approx \beta g(-\xi)$), then the integrated phase shift distortion after four round trips cancels out:

$$\phi_{4,\frac{\pi}{2}}(x, y) \approx 0$$

This condition can be achieved for a laser rod with a square cross section with thermally flux boundary conditions approximated by thermal equilibrium $Q_1 + Q_2 + Q_3 + Q_4 \approx 0$, and with $|Q_1 - Q_2| \approx |Q_3 - Q_4|$.

Phase distortion cancellation may also be achieved if $g(-x) + g(x) = b$ and $f(x) + f(-x) = a$ within the beam, even if $\alpha f(\xi) \neq \beta g(\xi)$, or $\alpha f(\xi) + \beta g(-\xi)$.

More generally, near the center of the rod, the phase distortion may be fit to a function $\phi(x,y) = \alpha f(x) - \beta g(y)$, where $\alpha f(x) = \alpha_3 x^3 + \alpha_2 x^2 + \alpha_1 x + \alpha_0$
and $\beta g(y) = \beta_3 y^3 + \beta_2 y^2 + \beta_1 y + \beta_0$ In this case $$\phi_{4,\frac{\pi}{2}}(x, y) = 2(\alpha_2 - \beta_2)(x^2 + y^2) + 4(\alpha_0 - \beta_0)$$

Ignoring the unimportant piston term $4(\alpha_0 - \beta_0)$, only a symmetric focus term remains $$\phi_{4,\frac{\pi}{2}}(x, y) \approx 2(\alpha_2 - \beta_2)(x^2 + y^2).$$

Approximate cancellation within region of the laser beam may be achieved for rods without a square cross sections by using single round trip intensity pattern rotations differing from 90 degrees. More generally speaking, for geometries in which the thermal distributions result in $\alpha_2 \approx \beta_2$ the phase distortions are cancelled through image rotation. Otherwise, the remaining optical power in the crystal may be compensated by an intra-cavity symmetric focusing element.

For example, the condition of phase cancellation after multiple round trip accumulation may be conveniently met by these examples. However, the phase accumulation after multiple round trips may be adjusted by adjusting heating heat fluxes Q1 and Q2 through the respective surfaces 414 and 410 and by adjusting cooling heat fluxes Q3 and Q4 through the respective surfaces 412 and 408 of the same rod.

With adjustment of these heat fluxes individually, embodiments may modify the phase distortion accumulated over multiple round trips, potentially creating a net magnification for a round trip of the resonator. The adjustment of the heat fluxes may be done along the entire rod or may be varied along the rod, such as by controlling one portion of the rod separately from another rod or by driving a controller of one portion differently from another portion of the rod.

Figure 5:
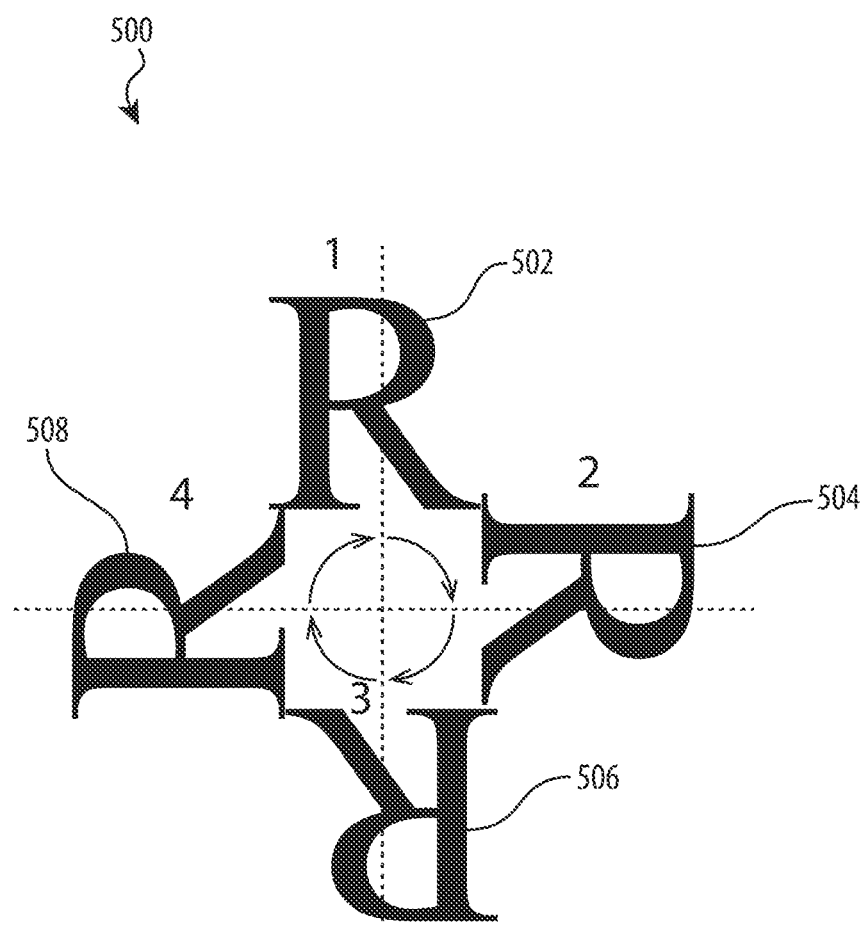
FIG. 5 illustrates the effects of rotations that average on each other upon successive round trips.

FIG. 5 illustrates the effects of rotations that average on each other upon successive round trips. The rotations include and are composed of inversions that combine during a round trip to result in a rotation or simply an inversion. With proper additions of inversions during a round trip of the cavity, such as through embodiments described herein, the image rotation of the laser light can be shown to average out aberrations that are contained in the resonator or induced/controlled/tuned as described elsewhere herein. These aberrations being averaged by the image rotation may include magnifications, hot-spots, areas of undesired stability or instability, etc.

The embodiments shown select 90 degree image rotations 500 for ease of illustration and for demonstrating the effects of image rotation on the particular cavities described herein. The selection of 90 degrees allows a fully averaging image rotation to be performed within four round trips of the resonator. These image rotations 500 are used to show how aberrations are averaged properly through selection and design of the particular cavities herein. Other aberrations described herein, whether induced distortions or properties (controlled or uncontrolled) of the optics forming the cavity. For example, as described further herein, an optical power or magnification of an element of the cavity may have axial components or aberrations that are averaged over successive round trips via the image rotations 500.

The illustrated image rotations 500 takes an upright radiation image pattern illustrated as R in position 502 and rotate it sequentially by 90 degrees through successive round trips to position 504, 506, 508, and back to position 502.

The selection of four rotations and 90 degrees describes a simplified and generalized case for ease of discussion. As described further herein alternative rotations may be considered although they are more complex and may require more round trips to properly or effectively cancel aberrations in phase or amplitude that are incurred from a single round trip. In cases where non-trivial numbers of round trips are needed to effectively cancel aberrations, the requirements for short pulse durations may require a limited number of options for the amount of image rotations per round trip and the required round trips for effective cancellation.

The image rotations 500 rotate the image pattern R from position 502 to position 504 without additional inversion of that radiation image pattern. Similarly, the next round trip simply rotates from the R in position 504 to an upside down R in position 506. Again, this rotation is not simply an inversion about a horizontal axis of the image of R from position 502. Instead, the combined effect of the rotations without additional inversions allows the "upside down" image of R in position 506 to properly cancel the image of the "upside up" image of R in position 502, after only two round trips. Similarly, the next rotation of the image of R in position 506 to position 508 which properly cancels the image of R in position 508.

Therefore, proper construction of the resonator, as described herein and illustrated via several embodiments including one or more out of plane reflector(s), provides for rotation that properly averages the radiation patterns of the beams. As described above, these completed averages of aberrations after four round trips is a simplified generalized case of a very large set of cases for the described embodiments, including different rotations per round trip and different numbers of round trips to effectively average those images.

Figure 6:
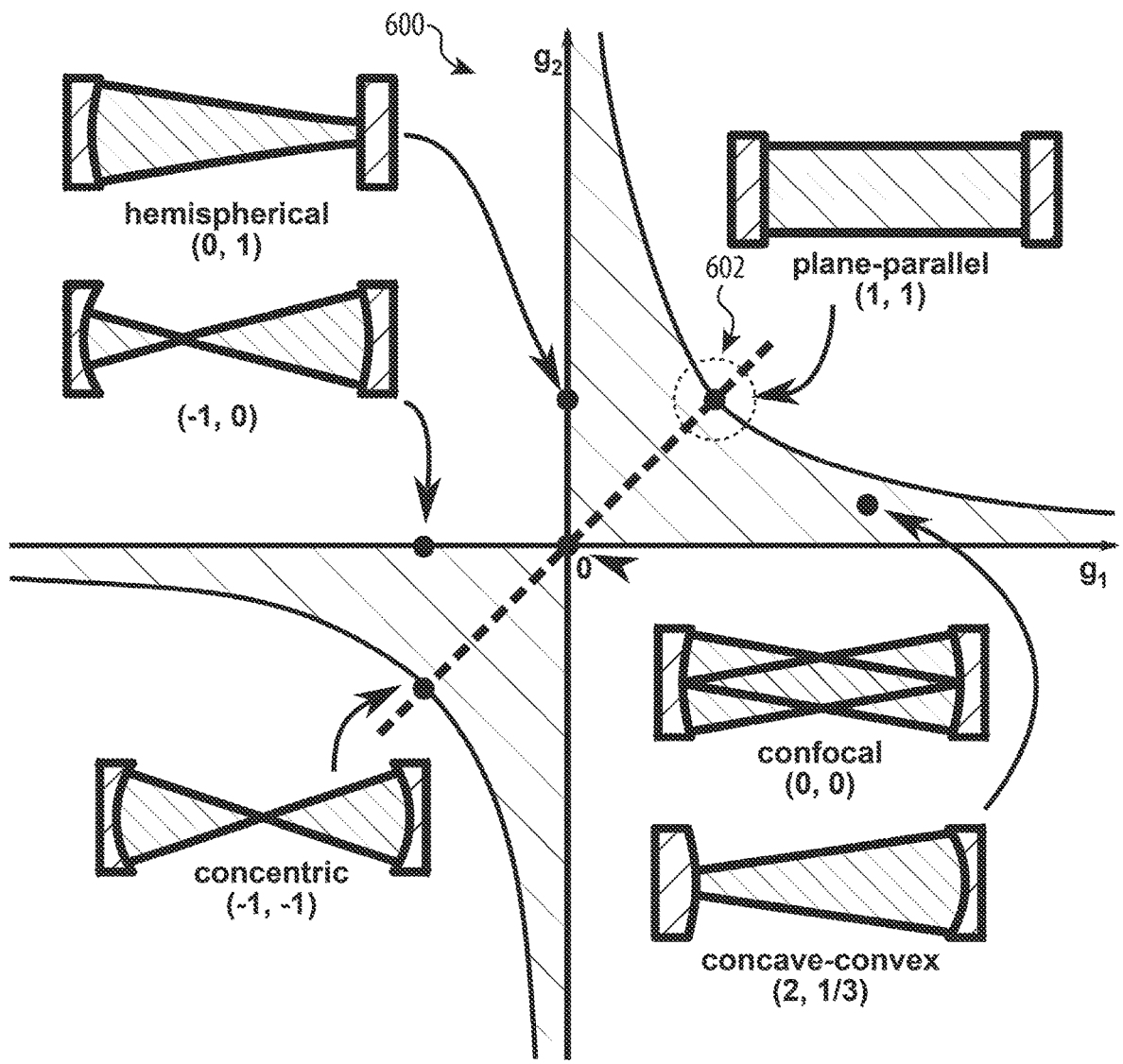
FIG. 6 shows diagram illustrating laser resonator stability and a class of laser resonators with a roundtrip magnification of 1.0 (plane-parallel or equivalent cavity).

FIG. 6 shows a diagram 600 illustrating laser resonator stability and a class of laser resonators with a roundtrip magnification of 1.0 (plane-parallel or equivalent cavity) as shown by the dotted line with unity slope and crossing through the origin of the graph. The graph shows cavity stability for exemplary linear cavities with respect to the stability parameters of the two end reflectors therein. However, this graph may be conceptually-extended to the ring cavities described herein with multiple reflectors such as six or eight reflectors. The image attribution for license to FIG. 6 reads: "Laser resonator stability" by "FDominec" and licensed under CC BY-SA 3.0 via Wikimedia Commons.

Magnification or other aberrations in the cavity can produce light in the cavity that is projected out of the optical path or otherwise "walks" off the path at certain portions of the cavity. For simple magnifications, a light beam may become larger than a limiting aperture and the light may be apodized, diffracted, reflected, or otherwise lost outside of the optical path.

The term aperture is used herein to include both functional and physical apertures. For example, if gain is not available in a portion of the gain medium that may otherwise transmit light, this inactive region of the gain medium may act as a functional aperture, but not as a physical aperture because while light may travel within the entire gain medium, the beam will not include the volume of no gain, apart from transient light that does not survive a period of multiple round trips.

Similarly, components with optical powers that are not symmetric may have phase distortion effects on light in the optical path rotated and accumulated over a number of round trips to create a net magnification. Some embodiments described herein utilize these particular functional definitions within the resonator in order to balance disparate and conflicting detrimental effects of the aspects of the resonator described herein, such as operating near or past the critical plane parallel magnification condition.

Typically, plane-parallel cavities are difficult to align because slight misalignments of reflecting elements in a plane-parallel cavity result in radiation walking out of the cavity within a few roundtrips and thus are ineffective as lasers. Cavities are technically stable when their magnification conditions are shown beneath the asymptotes, or in the shaded portion of the graph. For conditions near plane-parallel, aberrations may create different areas of net magnification, creating areas of instability, where radiation will diverge and create poor beam quality in the output. Therefore, resonator cavities are generally designed to operate in stable conditions and to avoid areas near either the asymptotes or, for cavities on the unity slope dotted line, near the plane-parallel condition for the resonator.

Because of these misalignment worries, lasers constructed of multiple bulk components and many lasers constructed larger than micro-scale are often designed to avoid this critical magnification=1.0 condition or any magnifications near 1.0 that could allow aberrations, heating gradients or other conditions to let local operating conditions approach this critical condition.

This area avoided by conventional resonators with polarization output coupling is roughly shown in the graph 600 by the dotted area 602. For example, a limit of magnification for stability of a resonator may be 0.9 net magnification per operational round trip. As another example, a limit of magnification for stability of a resonator may be 0.95 or 0.99 depending on the tolerances of the components and operation of the resonator. Each of these magnifications may produce areas of instability and stability, adjusted as described further herein. As another example, an operational regime with a magnification near 1.0 cannot work for conventional resonators due to perturbation instabilities.

However, these operational regimes with magnifications near 1.0 may be operated by the resonators herein using the described techniques.

The description herein of controlling the magnification within the resonator with apodization may also be understood as controlling stability parameters of the resonator with respect to perturbation instability within the resonator. Skilled artisans may easily translate the descriptions herein of controlling magnification to appropriate disclosure of the same controlling and modification steps with respect to perturbation instability of the resonator.

In the embodiments described herein, the resonators are configured to control and operate in conditions near plane-parallel, including in conditions of instability with net magnifications of above 1.0 per round trip, as shown in the graph 600 by the dotted circle 602 around the plane-parallel condition. Via the various embodiments of resonators and assembly methods described herein, the resonators are able to operate and output pulsed laser light stably despite maintaining conditions of instability throughout the resonator. This mode of operation of the resonator is described as a "critically unstable" operating condition or "critically unstable" operation herein for illustrating that the distinctions of the techniques for designing and constructing a resonator into this unstable condition that is counterintuitively critical to producing a stable operating resonator.

Critically Unstable Condition

Although resonators conventionally are designed to avoid plane parallel conditions and to remain stable, there are reasons in the embodiments described herein to intentionally design in a slight and tuned deviation into unstable magnification conditions.

Conventionally, resonators that operate at or near plane parallel conditions are avoided because it is uncontrollable where phase distortions or other aberrations within the resonant optical path will create regions of stability that would preferentially concentrate lasing action in portions of the optical path and burn out those portions. In addition, the plane parallel or nearly plane parallel conditions lead to additional difficulty for laser design due to increased sensitivity to misalignment. For lasers operated at or very near the plane parallel condition, the resonators are only critically stable and slight misalignments, aberrations or uncontrolled lensing close to that critically stable point can destroy the functionality of the resonator. In other words, bulk reflectors in resonators operated near plane parallel need significant efforts at alignment if they are to operate. However, embodiments described further herein that operate very near a plane parallel condition achieve close tuning of the magnification condition of the resonator via may be achieved without misalignments causing the resonator to fail.

In embodiments described herein, the resonator is designed to operate very close to plane parallel, or in an unstable condition that requires further balancing to allow the resonator to operate. The term used herein to describe this balanced unstable condition is "critically unstable" (or "critical instability") referring to the tuned and controlled instability of the resonator's operation. By balancing the resonator carefully in this critically unstable condition, the embodiments herein extract significant energy out of the gain medium (e.g., crystal).

In some embodiments herein, the elements forming the resonant optical path have optical powers or aberrations that operate along or around one axis and/or in one rotational direction of the resonator. These aberrations may influence astigmatism or differential focusing along one axis of the beam during a single round trip. Upon multiple round trips, and utilizing the polarization preserving image rotation operational modes, these aberrations may be combined on successive round trips of the resonator cavity to cause to combine and average, with a net round trip magnification.

Elements and methods are described herein that tune an overall magnification to this critically unstable condition, and thereby combine and balance these described instabilities, aberrations, and magnifications of the resonant optical path during operation. Methods are also described herein for tuning such critically unstable operational conditions in the described resonators, including methods that simplify assembly around a final assembled bulk component. This method simplifies an already simplified assembly procedure that reduces the effects of misalignments, which is important when producing any compact resonator from bulk components.

Figure 7:
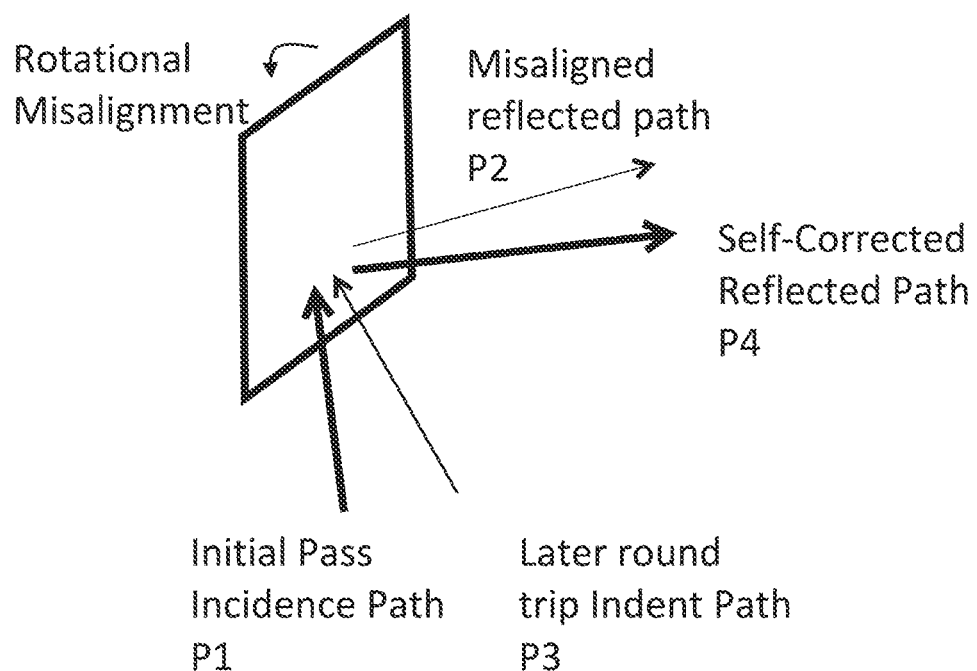
FIG. 7 shows an exemplary embodiment of diagram showing how misalignments are compensated for in later roundtrips of the radiation.

FIG. 7 shows an exemplary embodiment of diagram showing how misalignments are compensated for in later roundtrips of the radiation.

Using image rotation, misalignments are compensated with multiple roundtrips. For example, with a 90 degree rotation per round trip, light that is misaligned to the left will be rotated by 180 degrees after two round trips so that source of misalignment every other round trip will be correcting.

Light incident along an initial pass incident path P1 intercepts a flat reflector in the cavity with an angular misalignment. As a consequence, the reflected light travels along a misaligned reflected path P2 with a first deviated angle relative to an ideal direction. After rotating in the cavity during one or more round trips, the light returns to the mirror from a deviated angle as a consequence from the first deviated angle. On the subsequent reflection from the misaligned reflector, a second deviated angle is applied to the beam path, however it is compensated by the 180 degree rotated first deviated angle, so that the beam is reflected along the ideal self-corrected reflected beam path P4.

Thus, as shown in the FIG. 7, image rotation in the non-planar resonator described herein results in operation that has a high tolerance for misalignment (making fabrication easier and cheaper), enables plane-parallel equivalent cavity modes for large mode-area and compact energy extraction, and slower component count without focus-related alignment costs.

Out of Plane Prism

In several embodiments of the resonator, a prism may be substituted for portions of the resonator for the purposes of reducing element count, lengthening the round trip optical path length, and simplifying assembly techniques.

The embodiment of the prism and resonator shown has three reflections contained in the prism (e.g., a three-bounce prism), including two in plane total internal reflections and a single out of plane total internal reflection. Thus, the prism shown includes three inversions from each reflection, and an attendant image rotation due to the out-of-plane reflection.

The prism is configured to replace certain portions of the resonator in some embodiments, and the functions of those portions may also replace by the prism or may be replaced by additional bulk components. For example, to embody an image rotation portion of the optical path, the prism may be configured with respect to the cavity such that at least one of the total internal reflections is out of plane. In one embodiment, the prism embodies at least one element the out-of-plane elements. In one embodiment, the prism contains the entirety of the out-of-plane portions of the optical cavity.

In one embodiment, the prism receives and returns light on the optical path on the same plane, e.g., the plane of the rest of the resonator. In another embodiment, the prism receives and returns light on the optical path on different planes, e.g., receive on one plane and return on another. For example, an in-plane reflector may be positioned outside of the prism to return the optical path onto the other plane of the resonator. In one embodiment, an odd number of reflections is contained in the prism. In another embodiment, an even number of reflections is contained in the prism.

The prism does more than combine multiple reflections into a single element. For example, a corner cube, by itself, would not create the same effects on the optical path of the resonator without changing/adding further elements in the optical path. Instead, the reflections and optical path inside the prism include several of the many effects on the path other than simply reflections and inversions. Prism substitutions inside the resonator require coordination of the effects on the optical path that are being substituted including image rotation and aperture control of the beam. In addition, prisms may include other functions, such as providing optical gain, magnification, aperture, or other beam modifications in the single element. In one embodiment there are multiple prisms containing different portions of the optical path and/or each producing different optical transformations on the optical path.

Figure 8:
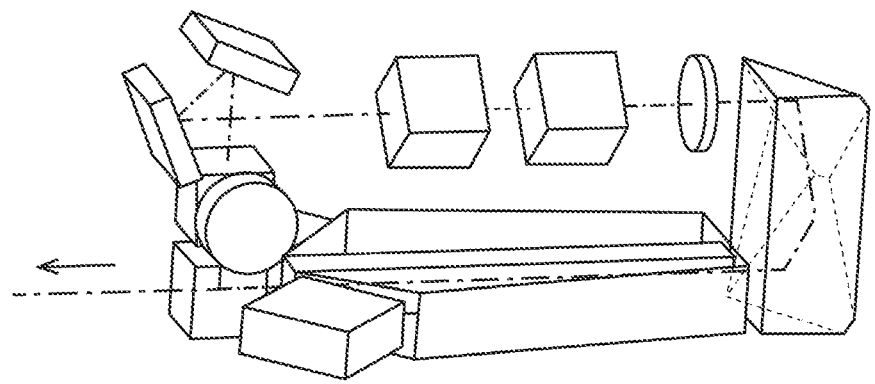
FIG. 8 shows an exemplary embodiment with three of six reflectors being functionally contained along with the associated optical path inside a solid prism.

FIG. 8 illustrates an alternative embodiment for a 6 reflection non-planar resonator, including a three-bounce prism containing the entirety of the optical path lying in one of the planes. This embodiment uses a prism that includes a single out of plane reflection and two in-plane reflections to maintain functional equivalence for the substitution with the individual bulk elements of the resonator. Prism embodiments may also be used for lengthening the optical path and thus increasing the fundamental pulse length of the cavity. For example, as shown, the plane containing less than half of the round-trip optical path of the resonator is entirely contained within the prism.

In other words, in the embodiment shown, light propagating on the optical path enters and exits the prism on the same plane as the rest of the optical path. Between entering and exiting the prism from the optical path, the light has undergone three net inversions inside the prism, including one inversion due to an out of plane reflection, and an attendant image rotation.

Internal reflections within a prism are designed to be functionally substituted for other elements in the cavity. For example, an internal reflection of a prism may be used similarly to a mirror for reflection (e.g., in-plane, out of plane) and possibly for part of the image rotation of the cavity, as described further herein. In one embodiment, portions of the prism itself or a facet(s) thereof can also create a functional aperture for a generated laser beam profile, either inside or outside the prism. In another embodiment, another element of the cavity or a combination of elements can be used to create a physical aperture, implemented to achieve the beam qualities described further herein.

Figure 9:
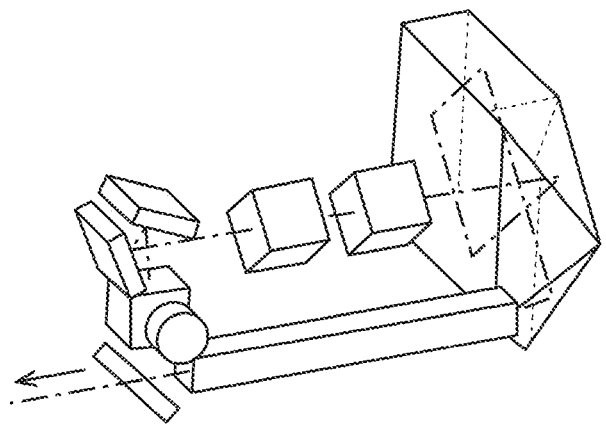
FIG. 9 shows an exemplary embodiment with five of eight reflectors being functionally contained along with the associated optical path inside a solid prism.

FIG. 9 shows an embodiment containing a five-bounce prism that is substituted for and contains a longer portion of the optical path of the resonator. In the embodiment shown, five reflections are substituted by the prism in an 8-reflection resonator. As described herein, there are functional equivalences configured in how the prism is designed or installed to substitute for the portion of the resonator being replaced. In addition, in this embodiment, by configuration of the larger prism also adds significant path length to the resonator cavity, thus increasing its round trip time and fundamental pulse length of pulses produced. As shown, the larger prism contains to reflections in plane that direct the optical path to/from the other plane of the resonator, and the entire optical path in that other plane is contained within the prism. The larger prism also has three out-of-plane reflections, creating an attendant image rotation in the prism due to the path reflecting into and out of the other resonator plane.

A five-bounce prism may create additional resonator volume in a plane orthogonal to the plane defined by the bulk components, thus providing trade-offs in resonator design between pulsed-output power (e.g., pulse length) and physical size of the resonator. Other embodiments, such as embodiments with output periscopes or other output optics, may include additional necessary volume outside of the resonator. These embodiments of the resonator may have different requirements for the size of the resonator itself and its other features, such as energy output or pulse length.

Figure 10:
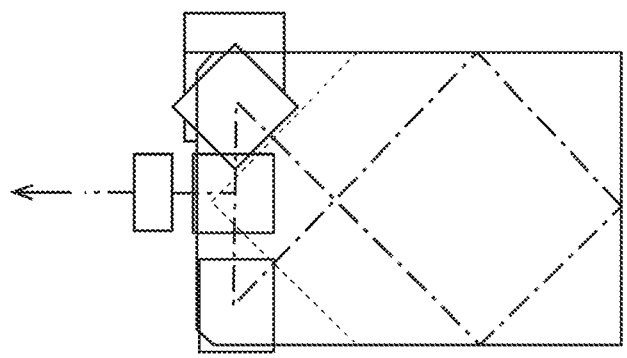
FIG. 10 shows another view of the exemplary embodiment of FIG. 9 as shown viewed normal to the plane of the portion of the optical path contained within the prism.

FIG. 10 shows another view of the five-bounce prism, with the primary resonator plane perpendicular to the image plane and the other plane of the resonator in the prism parallel to the image plane. The view shows the relative shape of the embodiment and the extreme "L" shape along two orthogonal axes. In some embodiments, volume is not as a premium in all directions, and the length of the optical path may be desired despite the additional volume in an orthogonal direction. Embodiments such as those with the five reflections embodied as total internal reflections in a prism along this orthogonal plane provide such a compact resonator with elongated path lengths.

Alternative configurations can adjust for particular outputs, including output optics as shown in embodiments with output periscopes. Therefore, through particular configurations both of the internal resonator optics, such as using prisms inside the resonator, and the optics external to the resonator, the compact resonator cavity can be altered and combined with other optics to create a flexible resonator platform for many applications.

Figure 11:
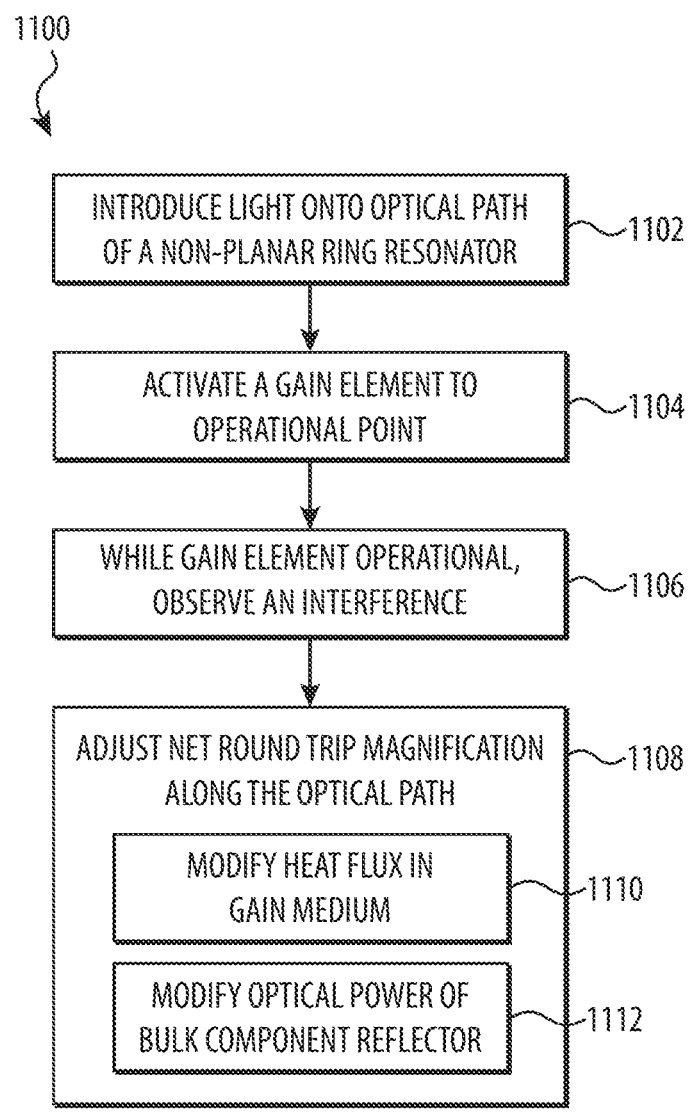
FIG. 11 illustrates an assembly process for assembling the laser and adjusting finally the placement of the final bulk component to tune the resonator.

FIG. 11 is a flow chart of a method for adjusting the net round trip magnification of a resonator to induce a critically unstable condition. The method 1100 includes introducing light onto an optical path of a non-planar ring resonator, such as one of the embodiments of resonator described herein. This light may be from a seed or other source. In addition, this light introduced in step 1102 may be the same wavelength as or a different wavelength from the lasing light produced while the resonator produces a laser output.

A gain element of the resonator is activated 1104 to an operational point. Operational points of the gain element (e.g., pumping and cooling) are described further herein, such as with respect to heating and/or cooling fluxes. This operational point may be a first operational point to be iteratively adjusted, also as described further herein to create a tuned round-trip magnification for the cavity. For example, the gain element may be operated to an operational level that is first determined from an initial determination of the light introduced in step 1102, such as from experience of an operator that the operation at that level produces interference that may be observed in step 1106 and, based on that observation, producing an estimate of the required adjustment to the round trip magnification will be needed in step 1108. As another example, the operational point may be initiated at a set level from experience or based on the type of resonator being tuned In the embodiment shown, the method then adjusts 1108 the round trip magnification along the optical path of the resonator. The method may adjust 1108 via modifying 1110 one or more heat fluxes in the gain medium. Alternatively or additionally, the method may adjust 1108 via modifying 112 the optical power of a bulk component in the resonator.

The introducing light 1102 into the resonators described herein with several of the particular attributes of the resonator that allow for balanced combination of deleterious effects, such as a non-planar ring resonator with an even number of reflections, one reflection outside of a primary resonator plane, and polarization output coupling. In addition, the resonator may contain a net magnification at the operational point of the gain element that must be adjusted, while the gain element is operational.

The observing 1106 a resonance of the resonator is performed while the gain element is activated 1104 at the operational point. This may occur while the resonator is spoiled as to producing laser output or while operating the gain element in spoiled condition. However, by introducing light onto the resonant optical path with pilot or seed light, the interferences created by the resonant optical path may be seen separately from the laser light output, and individual round trips of the light introduced 1102 onto the path may be observed (e.g., as shown in FIG. 2 with resonator spoiled).

In one embodiment, the activation of the gain element 1104 is performed with a bulk component that may be modified or replaced during the method. As further described herein, either or both of the magnification components from the gain element/medium and/or the bulk component optical power may be modified to achieve the desired critically unstable operation conditions for the resonator.

While the gain element is activated 1104 to the operational point, an interference is observed 1106 in the resonator with at least one bulk component and/or operating parameters (e.g., heating/cooling fluxes), that produce a net round trip magnification (including accumulated phase delays over multiple round trips) of greater than 0.9 per round trip. Other embodiments of the method may include different levels of net round trip magnification for the observing 1104 step. For example, the method may include a net round trip magnification is greater than 0.85, 0.9, 0.95, 0.99, 1.00, 1.01, 1.02, 1.03, 1.04, 1.05 or greater.

After observing 1106 the interference, the method 1100 includes a step of adjusting 1108 the net round-trip magnification of the resonator via at least two separate techniques/methods (modifying heat flux 1110, modifying optical power 1112). This step of adjusting 1108 may be performed iteratively between adjusting 1108 and observing 1106. For example, light may be introduced 1102 into the resonator while the observing 1106 and adjusting 1108 are being performed, including modifying the operational parameters of the gain medium 1110. The operation may include times when the resonator is not operated above 0.9 magnification condition, although, as described herein, the optimizing processes of the resonator will cause operation where the beam is wasted by a limiting aperture on the optical path.

In one embodiment, the technique for adjusting 1108 the net round trip magnification consists of modifying the heat flux 1110 of the gain medium. By modifying the heat flux 1110, as described in further detail herein, the phase distortion across the radiation image pattern of the beam is altered. This phase distortion is rotated along with the image rotation of the beam and becomes a net phase delay across the image pattern that may be represented (e.g., to first order, to second order) as a net magnification of the beam. Thus, the net round-trip magnification may be adjusted 1108 by modifying the heat flux, either by cooling and/or heating, through different sides of the gain medium.

In one embodiment, the technique for adjusting 1108 the net round trip magnification consists of modifying the optical power 1112 of a bulk component reflector in the resonant optical path. In one embodiment, the modifying the optical power 1112 may be performed by replacing a bulk component reflector (e.g., a zero optical power mirror) with one reflector (e.g., a cylindrical, a spherical mirror) that allows distortion adjustment. This substitution is performed to tune the magnification of the cavity while the gain element is in an operational point, accumulating the various aberrations, phase delays, and distortions of the operational resonator into a single net magnification that creates a critically unstable condition for the resonator.

In practice, a method 1100 for tuning the resonator, particularly where modifying the optical power 1112 of the bulk component reflector may be performed, the resonator may be assembled to allow easy access for adjustment or replacement of the bulk component reflector while the resonator is otherwise set up for operation. For example, the bulk component intended for tuning/replacement may be the last bulk component to be assembled, thereby allowing testing of the laser output while adjusting the component or simple substitution between observing 1106 different interferences. In one embodiment, a tunable mirror or substitute reflector is used during the tuning process, and another mirror is installed for the final assembly.

By adjusting an optical power of the last alignment optic, the method can use a select-and-test approach to get the best trade between beam quality and power. In one embodiment, modifying the optical power 1112 of the bulk component includes a physical rotation of the alignment optic with optical power (e.g., cylindrical reflector) with respect to the normal plane of the reflector. In another embodiment, modifying the optical power 1112 of the bulk component includes a physical translation of the alignment optic, such as a reflector with a third order curvature (e.g., Alvarez reflector) wherein the transverse position of the reflector adjusts the magnification of the resonant path.

One benefit of using a cylindrical optic is that there are finer gradient steps between available radii of curvature (by a factor of two) as opposed to spherical mirrors. In addition to the increased availability of selection gradients, by using a cylindrical curvature or optical power an axis may be selected for use to cancel astigmatic non-balanced optical powers of other components forming the resonant optical path. For example, an axis may be selected for placing a very slightly cylindrical mirror with either a positive and or a negative radius of curvature to offset another component that induces astigmatic (e.g., unbalanced) focus on the beam.

FIGS. 12-15 show an embodiment of a periscope set of optics configured to modify the laser output from the resonator. Many different types of optics may be included around the resonator to form, modify, or otherwise condition the laser output from the resonator before it is transmitted from the structure holding the resonator. For example, lenses, frequency modifiers, etc. may be used to create a desired usable laser output from the resonator output.

Figure 12:
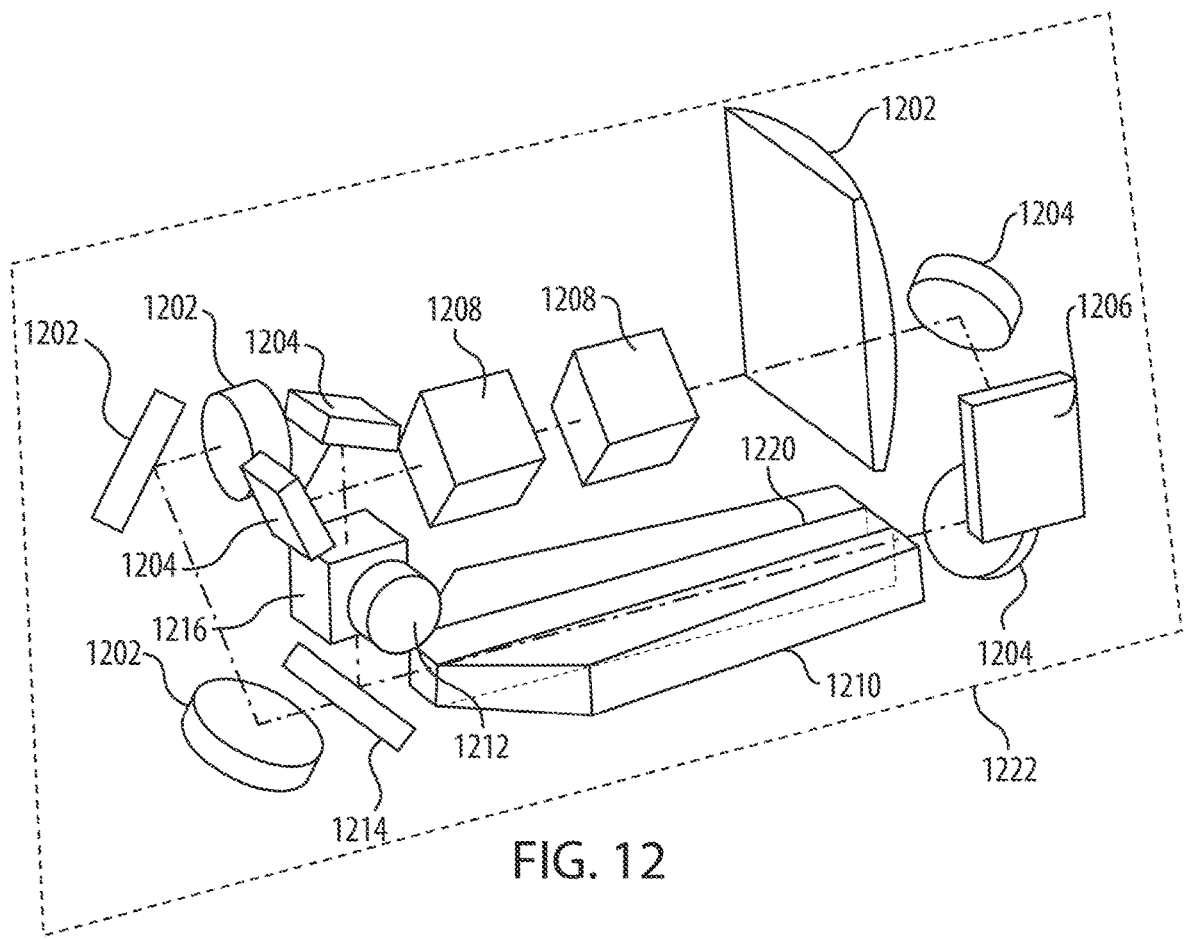
FIGS. 12-15 show different views of an embodiment with a periscope output for further beam modification of the output after leaving the resonator, while retaining a compact overall laser package.

FIG. 12 shows an embodiment of a resonator with an output periscope 1202 coupled to the resonator output. This periscope 1202 is an exemplary embodiment of output optics that reside outside the resonator to modify its output, such as to magnify the output and change the output's direction. The output periscope 1202 therefore includes exemplary reflectors, an intermediate optic (e.g., a lens) and an output lens, all generally designated 1202.

Other elements are similar or have similar functions to those in FIG. 1. For example, the gain element 1210 shown is broader than that shown in FIG. 1 due to a pump light chamber on two sides of the gain medium 1220. The pump light chamber on the sides of the gain element 1210 produces internal reflections based on input facets, yet the gain medium 1220 functions similarly to the generalized symmetrical gain element described herein with a square cross section. Similarly, two Pockels cells 1208 are shown in FIGS. 12-15 while only one is shown in FIG. 1, however both configurations impart a controllable delay that shifts output as described further herein. Other elements are similar, such as resonator reflectors 1204, a primary resonator plane 1222, an out of plane reflector 1206, a reverse wave suppression reflector 1212, a polarizing beam splitter 1216

Figure 13:
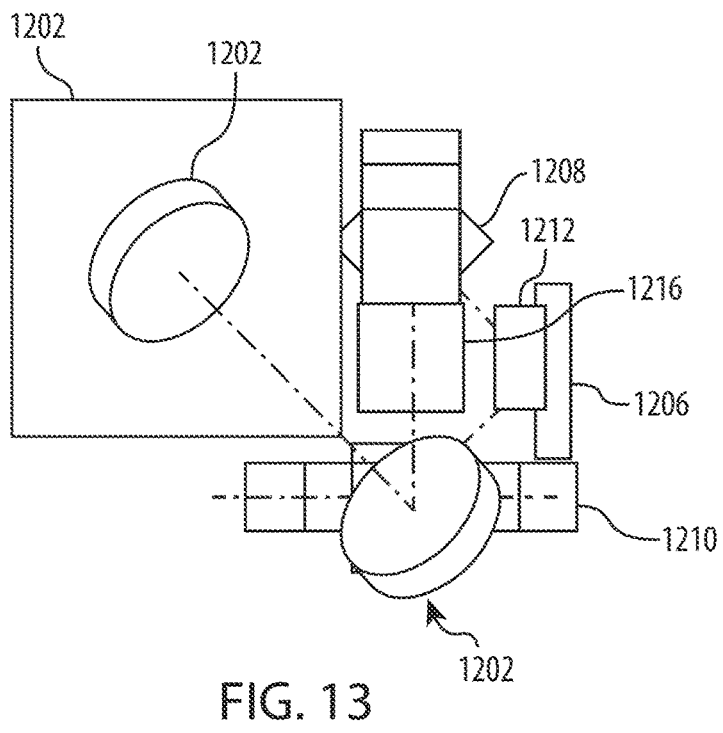
Figure 14:
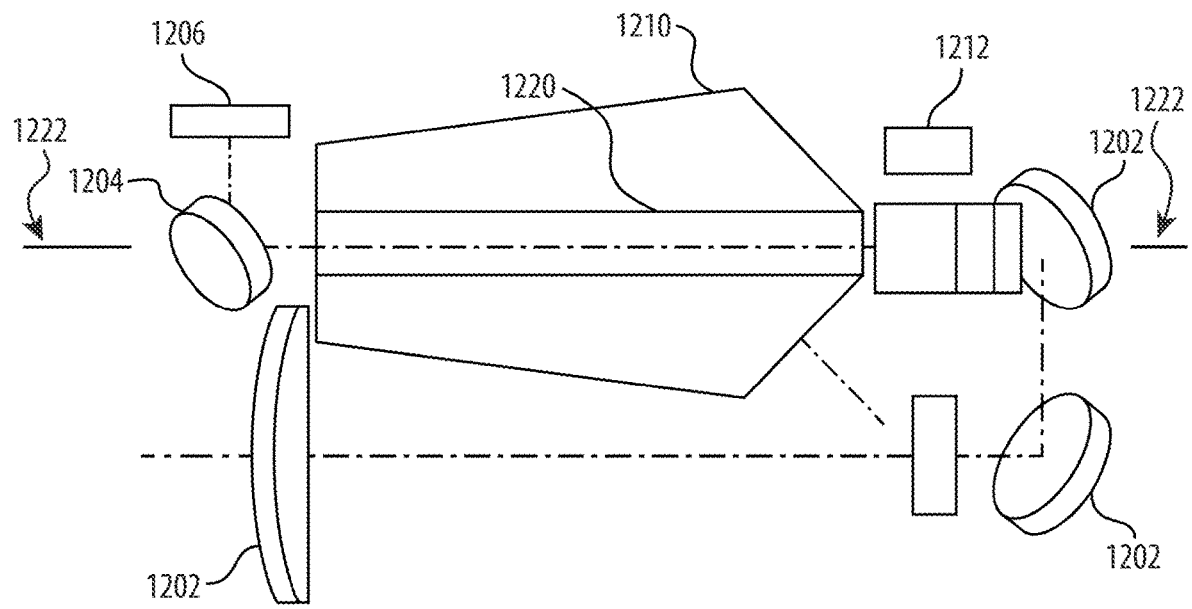

FIGS. 13 and 14 illustrate other views of the embodiment with an output periscope from both top and bottom. The periscope 1202 is shown fitting outside the laser resonator, folding neatly along a major axis of the resonator. This particular configuration may allow additional optics to be included next to the resonator to complete the output format of the laser light needed for the application.

FIG. 13 shows a view along the primary resonator plane 1222 showing the very compact nature of the resonator along the plane. The periscope is able to fit alongside the resonator, but does create additional volume that is readily apparent from this view the periscope spreads horizontally to the square output lens 1202.

FIG. 14 shows another view of the embodiment with the periscope as viewed along the primary resonator plane 1222. This view is generally orthogonal to the view shown in FIG. 13. Again, the alongside fitting of the periscope 1202 is represented, and the effect of the breadth of the output lens of the periscope 1202 is more dramatically shown with respect to the width of the resonator. Despite the compactness of the resonator, alternative embodiments such as this periscope 1202 may be used for different applications, including applications where the compact nature of the resonator is utilized in conjunction with the need for larger optics for output. Alternative embodiments with output coupling in different configurations may also be utilized to integrate with optics external to the resonator.

Figure 15:
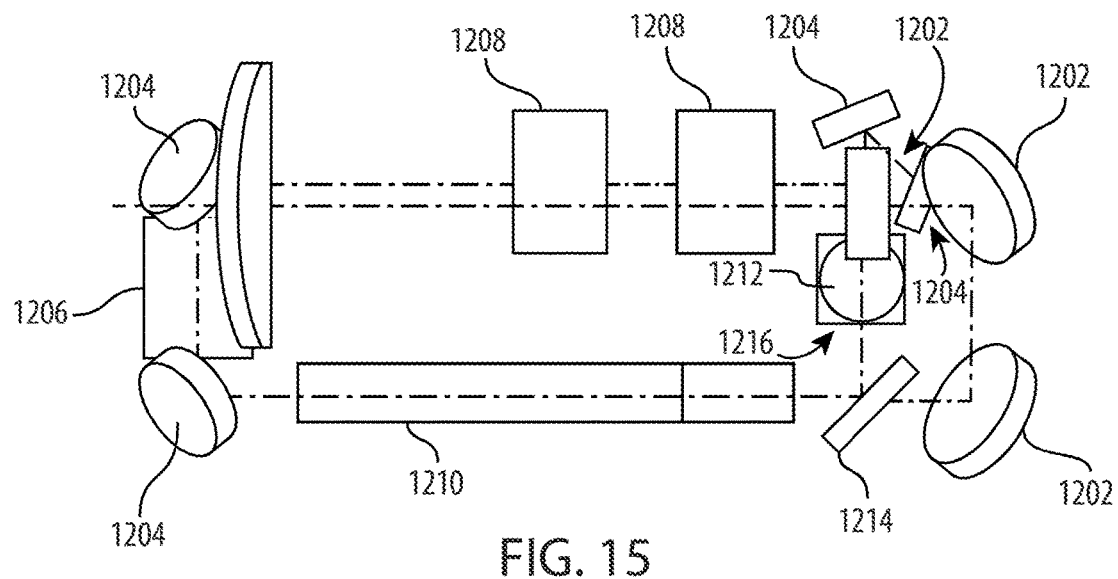

FIG. 15 shows another view of the embodiment with the periscope as viewed with the primary resonator plane in the plane of the image. The out of plane reflector is projected beneath the plane of the image. This view illustrates how the overall package of the laser may be coupled more efficiently along one or more axes than on others. The particular configurations of the resonators and output optics will therefore change according to the application and the embodiments described herein may be readily adapted to meet those applications.

This patent description and drawings are illustrative and are not to be construed as limiting. It is clear that many modifications and variations of this embodiment can be made by one skilled in the art without departing from the spirit of the novel art of this disclosure. While specific parameters, including doping, device configurations, parameters of components, and thresholds may have been disclosed, other reference points can also be used. These modifications and variations do not depart from the broader spirit and scope of the present disclosure, and the examples cited here are illustrative rather than limiting.

What is claimed is:

1. An optical system comprising:
    a laser ring resonator including a plurality of bulk reflectors, a gain medium, and a prism defining a resonant optical path of the laser ring resonator; and
    a reverse wave suppression reflector,
    wherein the prism provides an optical gain via the gain medium on the resonant optical path,
    wherein the resonant optical path includes a primary resonator plane, and
    wherein the resonant optical path includes a plurality of reflections in the primary resonator plane and a reflection to the reverse wave suppression reflector out of the primary resonator plane.

2. The optical system of claim 1, further comprising:
    a polarizing output coupler operable to transmit laser light that is polarized parallel to the primary resonator plane.

3. The optical system of claim 1, wherein:
    the reverse wave suppression reflector is operable to propagate laser light through the resonant optical path in a clockwise manner and in a counter clockwise manner.

4. The optical system of claim 1, further comprising:
    a feedback means operable to direct optical energy to be pumped into the gain medium to create a pulse.

5. The optical system of claim 1, wherein:
    the laser ring resonator is operable to average out aberrations in laser light via four round trips through the laser ring resonator.

6. The optical system of claim 1, wherein:
    the resonant optical path is configured to exhibit a critical instability near plane-parallel operating conditions based on a functional cavity net round trip magnification of greater than 0.85 on the resonant optical path.

7. The optical system of claim 1, further comprising:
    a Pockels cell operable to change a polarization of laser light during clockwise and counter clockwise trips through the resonant optical path.

8. The optical system of claim 7, further comprising:
    a controllable voltage source operable to apply a voltage to the Pockels cell to impart a phase delay on the laser light.

9. The optical system of claim 1, further comprising:
    a controllable cooling element operable to control thermal fluxes in the gain medium.

10. The optical system of claim 1, wherein:
    the gain medium comprises a shape that causes reflections of laser light within the gain medium.

11. The optical system of claim 1, further comprising:
    a laser pump source operable to pump the gain medium with laser light.

* * * * *